United States Patent [19]
Oishi et al.

[11] 4,417,704
[45] Nov. 29, 1983

[54] MAGNETIC RECORDING TAPE CASSETTE

[75] Inventors: Kengo Oishi; Osamu Suzuki, both of Odawara, Japan

[73] Assignee: Fuji Photo Film Co., Ltd., Odawara, Japan

[21] Appl. No.: 324,835

[22] Filed: Nov. 25, 1981

[30] Foreign Application Priority Data

Dec. 18, 1980 [JP] Japan .......................... 55-182183[U]

[51] Int. Cl.³ .......................... G03B 1/04; G11B 15/32
[52] U.S. Cl. .................................. 242/197; 242/199; 226/196
[58] Field of Search ......................... 242/76, 197–200; 226/196; 360/93, 96.1, 130.21, 132

[56] References Cited
U.S. PATENT DOCUMENTS 4,276,575  6/1981  Schoettle et al. .............. 360/130.21
4,290,567  9/1981  Saito .................................... 242/198
4,304,374  12/1981  Okamura et al. ................... 242/199

Primary Examiner—Leonard D. Christian
Attorney, Agent, or Firm—Gerald J. Ferguson, Jr.; Joseph J. Baker

[57] ABSTRACT

In a magnetic recording tape cassette having a tape guide member disposed on the recording side of a recording tape and a tape pad member which is pressed against the base side opposite to the recording side when the recording tape runs, at least a part of the tape pad member which is brought into direct contact with the recording tape when the tape pad member is pressed thereagainst is made of self-lubricating and hardwearing plastic resin.

1 Claim, 2 Drawing Figures

MAGNETIC RECORDING TAPE CASSETTE

BACKGROUND OF THE INVENTION

1. Field of the Invention

This invention relates to a magnetic recording tape cassette, and more particularly to a magnetic recording tape cassette having a guide member for guiding the magnetic tape and a tape pad pressed against the recording tape running along the guide member.

2. Description of the Prior Art

Recently, there have become available a video systems capable of ultra long video recording and reproduction, and VTRs (video tape recorders) which can memorize a recording schedule covering up to as long as a week and select TV programs to be recorded according to the memorized schedule. In such new video recording systems, six-hour recording is possible, while in conventional video recording systems only one- to two-hour recording is possible. Further, it is now expected that eight- to nine-hour recording will become possible in the near future.

In order to effect ultra long recording and reproduction of up to nine hours on tapes that can also be used with conventional recording and reproduction systems, it is necessary to enlarge the effective recording area of the magnetic recording tape. The effective recording area of a magnetic recording tape contained in a magnetic recording tape cassette can be enlarged by reducing the running speed of the recording tape, reducing the width of the recording track or increasing the actual surface area of the recording tape. However, the degree to which the running speed of the recording tape and the width of the recording track can be reduced is limited since the electromagnetic conversion efficiency must not be less than a certain value if the quality of the image and the sound is to be maintained at a satisfactory level. Thus it is necessary to increase the actual surface area of the magnetic recording tape contained in the cassette in order to lengthen the playing time of the video system. However the actual surface area of the magnetic recording tape contained in a cassette can be increased only by reducing the thickness of the magnetic recording tape to permit a longer magnetic recording tape to be contained in the cassette, since the diameter of the hub on which the tape is wound is standardized. Furthermore, high evenness of the surface of the magnetic recording tape is also required to improve the electromagnetic conversion efficiency.

However, when the thickness of the recording tape is reduced, the physical strength thereof is lowered and the tape is apt to be damaged by external forces. Further, high surface evenness of the tape generally results in backlash and other problems related to running instability and the high surface evenness is affected even by a small scratch on the surface of the tape, whereby stability of contact of the tape with the magnetic head is lost and the electromagnetic conversion characteristics are degraded.

As is well known, a tape pad is pressed against the rear surface of a magnetic recording tape when the tape is fed for recording or reproduction. This tape pad constitutes one of the elements imparting an external force which may damage the recording tape or cause the electromagnetic conversion characteristics to be degraded.

SUMMARY OF THE INVENTION

Accordingly, the primary object of the present invention is to provide a magnetic recording tape cassette having an improved tape pad which does not adversely affect the electromagnetic conversion characteristics of the magnetic recording tape even if the tape is very thin.

The magnetic recording tape cassette of the present invention is characterized in that the portion of the tape pad which is brought into direct contact with the magnetic recording tape is made of self-lubricating and hardwearing plastic resin.

DETAILED DESCRIPTION OF THE INVENTION

Figure 1:
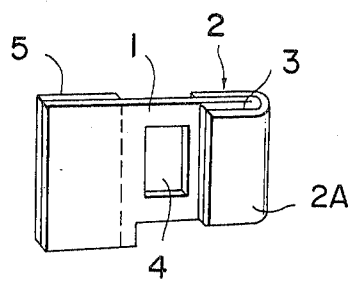
FIG. 1 is a perspective view showing the structure of a typical tape pad member.
Figure 2:
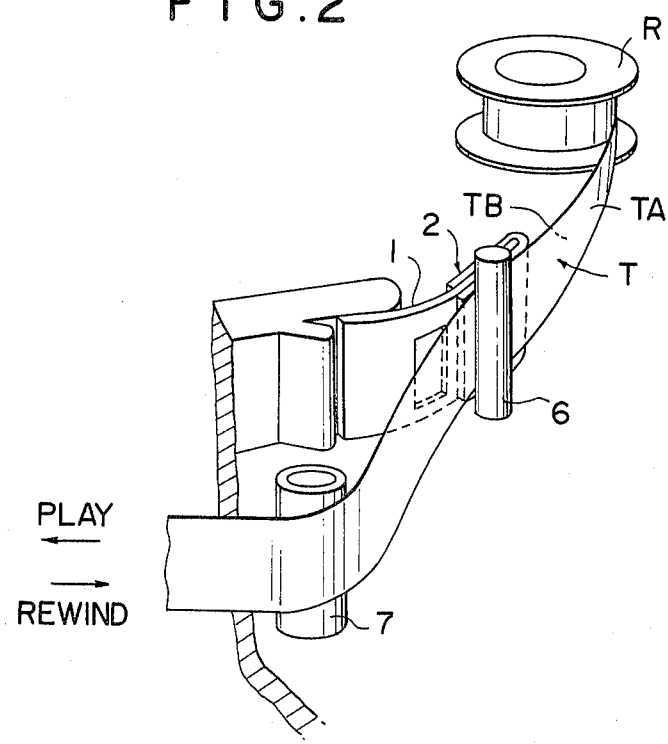
FIG. 2 is a view showing a part of a magnetic recording cassette employing the tape pad member of FIG. 1.

As shown in FIG. 1, a typical tape pad member includes a base 1 generally made of PET resin. One end of the base 1 forms an engaging portion 2 which is pressed against the base side of a magnetic recording tape T (FIG. 2). The engaging portion 2 is covered by a tape pad 2A comprising a pair of spaced plate portions connected by a bight portion and extending in the same direction therefrom. The tape pad 2A is fixed to the engaging portion by means of adhesive 3 with the engaging portion 2 being sandwiched between the plate portions. The tape pad member has an opening 4 for adjusting the pressure exerted against the recording tape T. On the other end of the base 1 remote from the engaging portion 2 is mounted a mounting member 5 for securing the tape pad member to the casing of a magnetic recording tape cassette. Generally a double-sided adhesive tape may be used as the mounting member 5. However the mounting member 5 may be omitted depending on the structure of the tape cassette.

The tape pad 2A is mounted on the tape cassette as shown in FIG. 2. The magnetic recording tape T fed out from a feed-out reel or hub R runs along a fixed guide pin 6 and a fixed guide member 7, and is fed to a VTR through an opening in the casing (not shown) of the cassette. When the recording tape T runs, the recording side TA thereof slides on the fixed guide pin 6 and the base side TB thereof slides on the fixed guide member 7 and the tape pad 2A.

There has been made an attempt to improve the running stability and the electromagnetic conversion characteristics by applying back coating to the base side of the magnetic recording tape thereby balancing the recording side of the recording tape with the base side thereof, improving the durability of the surfaces of the tape, and lowering and stabilizing friction coefficient of the tape.

However since the tape pad 2A is conventionally made of relatively soft material such as tetrafluoroethylene, when the base side TB of the recording tape T is provided with back coating, material of the tape pad 2A is apt to be peeled off from the engaging surface thereof. The peeled-off material adheres to the base side TB of the recording tape T and collects on the surface of the fixed guide member 7. Further, when the recording tape is wound onto the take-up reel (not shown) of the cassette, the peeled-off material still adhering to the base side TB is transferred to the recording side TA of the tape T in contact with the base side TB. Then the material transferred to the recording side TA is collects on the surface of the fixed guide pin 6 during rewinding of the tape T. Thus, when the recording tape T is repeatedly fed back and forth, the material peeled off from the tape pad 2A adheres to both sides of the tape T and collects on the fixed guide pin 6 and the fixed guide member 7. The peeled-off material on the surfaces of these elements damages the surfaces of the tape T and further promotes the peeling off of the tape pad material. Thus, the recording tape T loses its surface evenness, whereby the video RF output is caused to fluctuate. Further the peeled-off tape pad material adhering to the recording side TB of the tape T prevents the magnetic head from making good contact with the recording surface TB. This causes drop-out, for example, or in an extreme case the material may be transferred to the magnetic head to completely prevent video reproduction.

The magnetic recording tape cassette of the present invention is characterized in that the tape pad 2A is made of hardwearing plastic resin having self-lubricating property.

As the material of the tape pad 2A, there is used ultra-high-molecular-weight-high-density polyethylene containing at least one additive such as carbon or graphite with an average molecular weight of 2,000,000 to 4,000,000 and a specific gravity of 0.90 to 0.98.

Such ultra-high-molecular-weight-high-density polyethylene is highly self-lubricating as well as highly hardwearing. Therefore, the tape pad made of such material is not only highly resistant to damage but does not damage conventional video tapes or back-coated magnetic recording tapes, thereby contributing to maintaining high electromagnetic conversion characteristics and to lengthening the service life of the tape. Furthermore, the polyethylene resin is less expensive than tetrafluoroethylene conventionally used to make the tape pad. Therefore, in accordance with the present invention, manufacturing cost of the tape cassette can be lowered.

EXAMPLE

Three types of magnetic recording tape cassettes were prepared. The cassettes of the first type had a tape pad made of tetrafluoroethylene (used conventionally), the cassettes of the second type had a tape pad made of high-density polyethylene (Hi-Zex Million 240M, Mitsui Chemical, Japan), and the cassettes of the third type (this invention) had a tape pad made of ultra-high-molecular-weight-high-density polyethylene (Hi-Zex Million 340M, Mitsui Chemical, Japan). In all the cassettes, the tape pad was formed of a sheet material and had a thickness of 100 μm. Magnetic recording tapes of T-120 for VHS were used for each type of the cassettes.

The cassettes of each type were loaded with three types of VTR tape, i.e., VHS NV-8600, VHS NV-5500 (both of Matsushita Electric, Japan) and VHS VTR VT-3000 (Hitachi, Ltd., Japan) and the magnetic recording tapes were reciprocated 400 times each. The number of drop-outs was counted by means of a drop-out counter upon initial reciprocation, after 200 reciprocations and after 400 reciprocations. At the same time, the condition of the peeled-off tape pad material collected on the fixed guide pin 6 and the fixed guide member 7 and condition of scratches on the recording tape and the tape pad were visually evaluated and ranked into five grades, i.e., from 1 to 5 with 5 representing the best condition. The results are shown in Table 1.

The same experiment was conducted using magnetic recording tapes obtained by applying back coating to the above identified magnetic recording tapes. The results are shown in Table 2.

The values shown in Tables 1 and 2 are the average of values obtained with respect to the above three types of VTR tapes. The drop-out values were obtained by counting the number of drop-outs during one minute, a drop-out may be defined as a drop in output by 20 dB or more for 15 μsecs or longer.

TABLE 1

(T-120)

| Number of reciprocations | Material of pad | D.O. | Scratches pad | Scratches tape | Collected material |
|---|---|---|---|---|---|
| 0 | tetrafluoroethylene | 6 | | | |
| | high-density P.E | 9 | | | |
| | UHMWHD P.E. | 8 | | | |
| 200 | tetrafluoroethylene | 15 | 4 | 4 | 5 |
| | high-density P.E. | 13 | 5 | 4 | 4 |
| | UHMWHD P.E. | 13 | 5 | 5 | 5 |
| 400 | tetrafluoroethylene | 18 | 4 | 4 | 5 |
| | high-density P.E. | 23 | 4 | 4 | 4 |
| | UHMWHD P.E. | 21 | 5 | 5 | 5 |

*UHMWHD ... ultra-high-molecular-weight-high-density polyethylene

TABLE 2

(back-coated T-120)

| Number of reciprocations | Material of pad | D.O. | Scratches pad | Scratches tape | Collected material |
|---|---|---|---|---|---|
| 0 | tetrafluoroethylene | 9 | | | |
| | high-density P.E. | 11 | | | |
| | UHMWHD P.E. | 10 | | | |
| 200 | tetrafluoroethylene | 35 | 3 | 2 | 3 |
| | high-density P.E. | 20 | 3 | 3 | 4 |
| | UHMWHD P.E. | 19 | 5 | 5 | 5 |
| 400 | tetrafluoroethylene | 82 | 1 | 1 | 2 |
| | high-density P.E | 53 | 3 | 3 | 3 |
| | UHMWHD P.E. | 20 | 5 | 5 | 5 |

*UHMWHD ... ultra-high-molecular-weight-high-density polyethylene

As can be seen from Tables 1 and 2, the tape pad of ultra-high-molecular-weight-high-density polyethylene exhibits excellent characteristics compared with the other two tape pads in all aspects.

We claim:

1. A magnetic recording tape cassette having at least a hub for winding therearound a magnetic recording tape, a guide member disposed on the recording side of the magnetic recording tape and a tape pad member which is pressed against the base side of the magnetic recording tape when the magnetic recording tape runs in contact with the guide member, characterized in that at least the part of the tape pad which is brought in direct contact with the magnetic recording tape when the tape pad is pressed thereagainst is made of self-lubricating and hardwearing plastic resin wherein said plastic resin is ultra-high-molecular-weight-high-density polyethylene containing at least one additive such as carbon or graphite with an average molecular weight of 2,000,000 to 4,000,000 and a specific gravity of 0.90 to 0.98.

* * * * *